(12) United States Patent
Sakurai

(10) Patent No.: US 6,867,805 B2
(45) Date of Patent: Mar. 15, 2005

(54) IMAGE PICKUP DEVICE AND VIDEO SIGNAL PROCESSING METHOD

(75) Inventor: Tetsuo Sakurai, Kumagaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 667 days.

(21) Appl. No.: 09/983,319

(22) Filed: Oct. 24, 2001

(65) Prior Publication Data

US 2003/0001962 A1 Jan. 2, 2003

(30) Foreign Application Priority Data

Jun. 29, 2001 (JP) ........................................ 2001-200200

(51) Int. Cl.⁷ ............................ H04N 3/14; H04N 5/238
(52) U.S. Cl. .................... 348/296; 348/222.1; 348/364; 348/312
(58) Field of Search .............................. 348/222.1, 296, 348/362, 363, 364

(56) References Cited

FOREIGN PATENT DOCUMENTS

| JP | 4-189078 | 7/1992 |
|----|----------|--------|
| JP | 7-23268 | 1/1995 |
| JP | 10-233966 | 9/1998 |
| JP | 11-75118 | 3/1999 |
| JP | 11-164195 | 6/1999 |
| JP | 11-346334 | 12/1999 |
| JP | 2000-78463 | 3/2000 |
| JP | 2000-209492 | 7/2000 |

*Primary Examiner*—Ngoc-Yen Vu
*Assistant Examiner*—Carramah J. Quiett
(74) *Attorney, Agent, or Firm*—Pillsbury Winthrop LLP (57) ABSTRACT

A short duration of exposure is selected for the object for EVEN fields and a long duration of exposure is selected for the object for ODD fields by the electronic shutter, the obtained images being subsequently synthetically combined according to a synthetic reference levels in a dynamic range broadening mode. For the EVEN field, the duration of exposure is automatically controlled according to the brightness for high speed shutter operation. The level of REF is lowered when a small value is selected for the duration of exposure whereas the level of REF is raised when a large value is selected for the duration of exposure. In the case of a dark object that does not require any dynamic range, REF rises to get to the white clip level, when the mode is switched to an ordinary mode to increase the duration of exposure for both EVEN fields and ODD fields.

15 Claims, 6 Drawing Sheets

IMAGE PICKUP DEVICE AND VIDEO SIGNAL PROCESSING METHOD

CROSS-REFERENCE TO RELATED APPLICATIONS

This application is based upon and claims the benefit of priority from the prior Japanese Patent Application No. 2001-200200, filed Jun. 29, 2001, the entire contents of which are incorporated herein by reference.

BACKGROUND OF THE INVENTION

1. Field of the Invention

This invention relates to an image pickup device and a video signal processing method that can suitably be used in a monitoring video camera. More particularly, the present invention relates to the technology for broadening the dynamic range of a video signal so that the picked up image of the object including dark areas and bright areas may be clearly viewed with a sufficient contrast (gradation) effect.

2. Description of the Related Art

Conventionally, the image pickup device that is used in a monitoring video camera typically comprises an image pickup element such as a CCD (charge-coupled device) and the video signal obtained from the image pickup element is subjected to a predetermined signal processing operation (KNEE, gamma, detail, white balance, etc.) to produce a final video signal to be used for producing an image of the object.

However, image pickup devices such as CCDs generally show a narrow dynamic range and hence it is difficult to pick up an image of an object having a large difference of luminance between the dark areas and the bright areas thereof. Techniques for broadening the dynamic range by adding or synthesizing two video signals obtained from an object in different imaging conditions and weighted appropriately in order to alleviate the above identified problem are known. An image pickup device disclosed in Jpn. Pat. Appln. KOKAI Publication No. 2000-209492 (to be referred to as the first prior art document hereinafter) will be briefly described below as one of such known techniques.

According to the first prior art document, an image pickup device is adapted to obtain sequentially a first video signal for an image picked up by appropriately opening the diaphragm and a second video signal for an image picked up by narrowing the opening of the diaphragm. Then, the first video signal is compressed to a specified amplitude level. In the case where the compressed signal exceeds a threshold value that represents a predetermined brightness, the compressed first video signal is attenuated by using a predetermined coefficient while the second signal is amplified by using another predetermined coefficient and then the two signals are added to produce a video signal showing a broad dynamic range.

Other prior art techniques for broadening the dynamic range of a video signal are disclosed in Jpn. Pat. Appln. KOKAI Publication No. 10-233966 (to be referred to as the second prior art document hereinafter) and Jpn. Pat. Appln. KOKAI Publication No. 11-164195 (to be referred to as the third prior art document hereinafter).

An image pickup device according to the second prior art document is adapted to obtain sequentially two video signals with different extents of exposure to light by means of an image pickup element that is a CCD. Then, the video signal obtained with the smaller extent of exposure is corrected for gradation and the corrected signal is synthetically combined with the video signal that is obtained with the larger extent of exposure in order to provide the final video signal with a sufficient gradation effect for bright areas.

Now, an image pickup device according to the third prior art document is adapted to obtain sequentially two video signals respectively with a long exposure time and a short exposure time and hence with different brightness levels, which two video signals are then synthetically combined to produce a final video signal by using a composite function selected out of a predetermined number of composite functions depending on if the maximum luminance level exceeds a reference value or not.

However, with any of the image pickup devices according to the above cited first through third prior art documents, while high luminance areas provide a sufficient gradation effect, the obtained image can provide only a poor contrast effect when an object having a narrow dynamic range is picked up. This is because the video signal of an image picked up with a scarcely opened diaphragm (and hence with a small extent of exposure to light) does not provide a satisfactory level of luminance so that the video signal of a corresponding image picked up with a normally opened diaphragm (and hence with a relatively large extent of exposure to light) is compressed to below the predetermined reference level although no signal will be practically added thereto.

Additionally, when an image of an object showing a broad dynamic range is picked up, the parts of the signal obtained by addition show a fixed dynamic range to make the bright areas of the produced final image show only a poor contrast effect because the video signal of the image picked up with a normally opened diaphragm (and hence with a relatively large extent of exposure to light) is compressed to a fixed reference level.

Meanwhile, a system of obtaining two video signals sequentially under different exposure conditions provides an effect of broadening the dynamic range at low cost when it is applied to a conventional system for synthetically combining images obtained with different electronic exposure durations (a long exposure time of ⅟₆₀ seconds and a short exposure time) by using a CCD and a signal processing IC. However, the image obtained by means of such a system provides a vertical resolution that is only a half of the vertical resolution of an ordinary image (obtained by an ordinary imaging operation without the synthesizing process) and the number of images picked up per unit time is halved (e.g., 60 images per second to 30 images per second). This means that a jerkily and strangely moving image showing a low vertical resolution may be obtained from an object that does not require a wide dynamic range.

BRIEF SUMMARY OF THE INVENTION

According to the present invention, the above identified problems are dissolved by providing an image pickup device comprising:

an image pickup element for picking up an image of an object and generating a video signal of a frame and two fields out of the image;

an exposure control processor for providing two extents of exposure per field for the image pickup element;

a signal compression processor for compressing the first video signal output from the image pickup element for the larger extent of exposure as provided by the exposure control processor and exceeding a first reference value;

a signal compression/expansion processor for compressing or expanding the second video signal output from the image pickup element for the smaller extent of exposure as provided by the exposure control processor and exceeding a second reference value;

an addition processor for adding the signal from the compression processor and the signal from the compression/expansion processor and generating an output video signal having a dynamic range broader than the dynamic range of the image pickup element;

a detection processor for detecting the second video signal and discriminating one obtained for the smaller extent of exposure and one obtained for the larger extent of exposure by referring to the brightness of the second video signal;

a reference value control processor for decreasing the first reference value and the second reference value in response to detection of a video signal by the detection processor for the larger extent of exposure and increasing the first reference value and the second reference value in response to detection of a video signal by the detection processor for the smaller extent of exposure; and a mode switching processor for canceling the two extents of exposure and selecting an ordinary image pickup mode for the first reference value exceeding a predetermined value or selecting a dynamic range broadening image pickup mode for the first reference value underlying the predetermined value without canceling the two extents of exposure.

In another aspect of the invention, there is provided a video signal processing method comprising:

an exposure control step of providing two extents of exposure per field for an image pickup element adapted to pick up an image of an object and generating a video signal of a frame and two fields out of the image;

a signal compression step of compressing the first video signal output from the image pickup element for the larger extent of exposure as provided by the exposure control step and exceeding a first reference value;

a signal compression/expansion step for compressing or expanding the second video signal output from the image pickup element for the smaller extent of exposure as provided by the exposure control step and exceeding a second reference value;

an addition step of adding the signal from the compression step and the signal from the compression/expansion step and generating an output video signal having a dynamic range broader than the dynamic range of the image pickup element;

a detection step for detecting the second video signal and discriminating one obtained for the smaller extent of exposure and one obtained for the larger extent of exposure by referring to the brightness of the second video signal;

a reference value control step for decreasing the first reference value and the second reference value in response to detection of a video signal by the detection step for the larger extent of exposure and increasing the first reference value and the second reference value in response to detection of a video signal by the detection step for the smaller extent of exposure; and a mode switching step for canceling the two extents of exposure and selecting an ordinary image pickup mode for the first reference value exceeding a predetermined value or selecting a dynamic range broadening image pickup mode for the first reference value underlying the predetermined value without canceling the two extents of exposure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, the present invention will be described in greater detail by referring to the accompanying drawing that illustrate a preferred embodiment of the invention.

Figure 1:
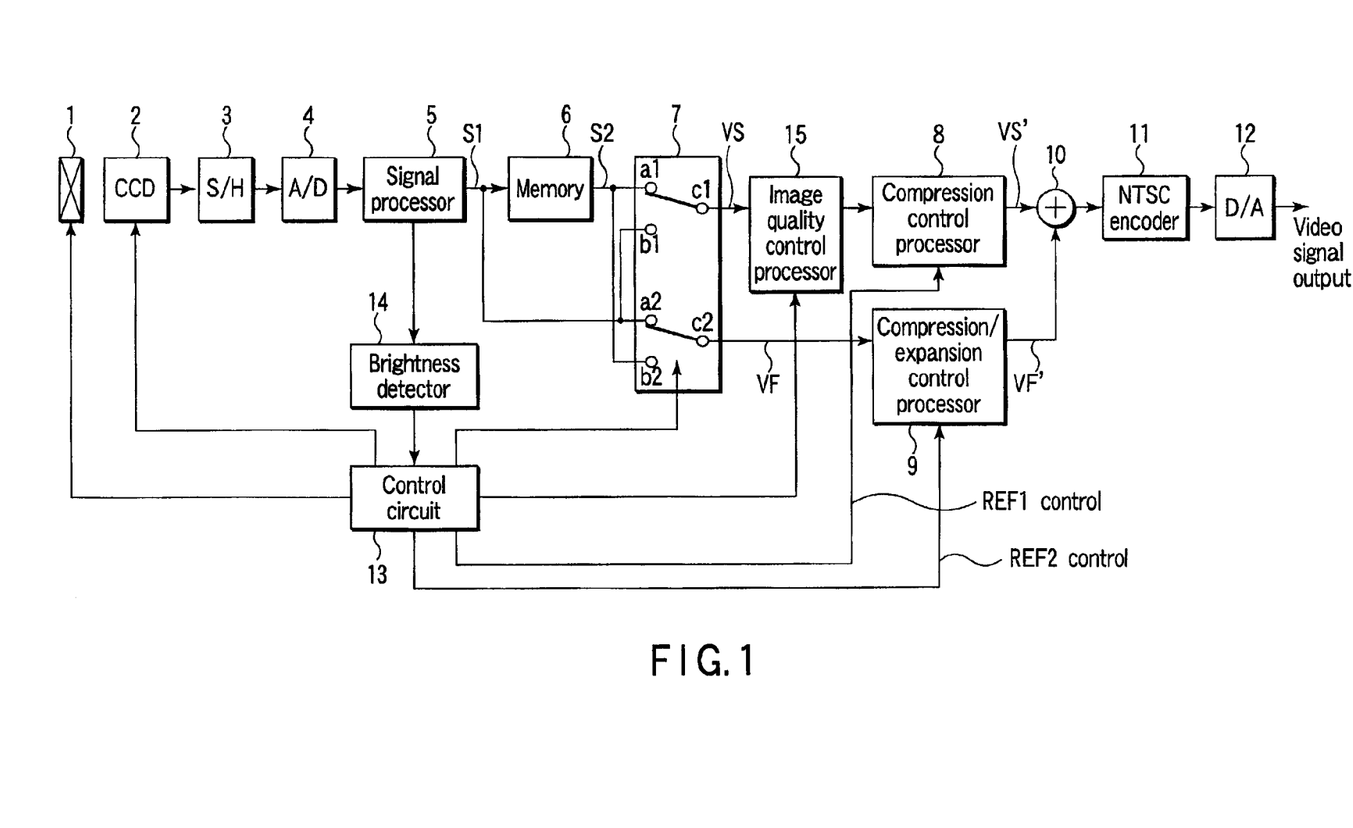
FIG. 1 is a schematic block diagram of an embodiment of image pickup device according to the invention.

FIG. 1 is a schematic block diagram of an embodiment of image pickup device according to the invention.

Referring to FIG. 1, reference symbol 1 denotes a lens diaphragm for regulating the extent of exposure of the image pickup device when picking up an image of an object. The opening of the lens diaphragm 1 can be controlled so as to regulate the extent of exposure stepwise. The image picked up with the extent of exposure controlled as a function of the opening of the lens diaphragm 1 is led to image pickup element 2 comprising a CCD and then subjected to photoelectric conversion by the image pickup element 2 so that it is transformed into an analog video signal. The image pickup element 2 is provided with an electronic shutter that can be operated stepwise for controlling the duration of exposure. Thus, the extent of exposure can be defined by controlling the opening of the lens diaphragm 1 of the image pickup element 2 and/or the duration of exposure. However, assume here that the extent of exposure is defined by controlling the duration of exposure for an image picked up by operating the shutter at high speed and by controlling the opening of the lens diaphragm for an image picked up by operating the shutter at low speed.

The analog video signals produced from the image pickup element 2 for the selected respective extents of exposure are then transformed into a digital video signal by means of a sample/hold circuit (S/H) 3 and an analog/digital converter (A/D) 4 and subjected to a predetermined video signal processing operation (KNEE, gamma, detail, white balance, etc.) by signal processing circuit 5.

The signal processing circuit 5 extracts data on the brightness of the video signal picked up with a smaller extent of exposure and outputs the data to brightness detection circuit 14. The brightness detection circuit 14 detects either the integrated value or the peak value of the brightness of the entire image or a predetermined region of the image from the input data on the brightness and outputs the obtained value to control circuit 13.

The control circuit 13 comprises a CPU among others and controls the opening of the lens diaphragm 1, the duration of exposure for the shutter of the image pickup element 2 and the switching operation of switch 7, which will be described hereinafter, according to the brightness detection data input from the brightness detection circuit 14. In addition, the control circuit 13 determines reference level REF 1 for controlling compression circuit 8, which will be described hereinafter, and reference level REF 2 for controlling compression/expansion circuit 9, which will also be described hereinafter. As a result, it controls the compression ratio of the former circuit and the compression or expansion ratio of the latter circuit. Furthermore, the control circuit 13 generates an image quality control signal for controlling image quality control circuit 15, which will also be described hereinafter, according to the brightness detection data input to it.

Alternatively, the operation of the image quality control circuit 15 may be controlled by the signal processing circuit 5 at a predetermined timing.

The video signal S1 output from the signal processing circuit 5 is input to a single image memory 6 adapted to store only a single image. The single image memory 6 is designed to delay the input video signal S1 by a period of time corresponding to a single image. The video signal S2 produced from the single image memory 6 with the delay time is fed to fixed terminals a1 and a2 of the switch 7. On the other hand, the video signal S1 output from the signal processing circuit 5 is fed directly to the fixed terminals b1 and b2 of the switch 7 without delay.

Figure 2:
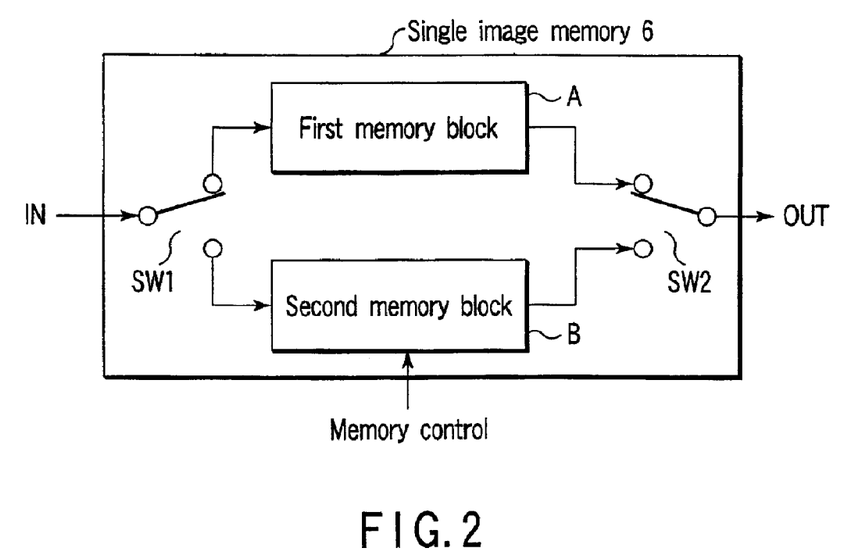
FIG. 2 is a schematic block diagram of one of the image memories of the embodiment of FIG. 1, illustrating the configuration thereof.

Referring now to FIG. 2, said single image memory 6 comprises a first memory block A and a second memory block B, each of which has a memory capacity corresponding to the video signal of a single image, along with switches SW1, SW2 for respectively selecting the input and the output of either of the memory blocks A and B. The read/write operation of each of the memory blocks A, B and the switching operation of each of the switches SW1, SW2 are controlled by means of memory control signals output from the control circuit 13.

Note that a video signal representing an image obtained with a large extent of exposure by operating the shutter at high speed is expressed by VS, whereas a video signal representing an image obtained with a small extent of exposure by operating the shutter at low speed is expressed by VF.

The switch 7 is controlled by the control circuit 13 for its switching operation in such a way that movable terminal c1 is alternately connected to fixed terminals a1 and b1, while movable terminal c2 is alternately connected to fixed terminals a2 and b2. With this arrangement, video signal VS representing an image obtained with a large extent of exposure is output from the terminal c1 and video signal VF representing an image obtained with a small extent of exposure is output form the terminal c2.

The video signal VS output from the terminal c1 is input to the compression circuit 8 by way of the image quality control circuit 15 and subjected to a compression processing operation in the compression circuit 8 according to the control signal from the control circuit 13. The video signal obtained as a result of the compression processing operation is denoted by VS'. Similarly, the video signal VF output from the terminal c2 is input to the compression/expansion circuit 9 and subjected to a compression/expansion processing operation in the compression/expansion circuit 9 according to the control signal from the control circuit 13. The video signal obtained as a result of the compression/expansion processing operation is denoted by VF'.

The compression ratio of the compression circuit 8 is controlled by the control circuit 13. This control is denoted by REF1 control hereinafter. The compression/expansion ratio of the compression/expansion circuit 9 is also controlled by the control circuit 13. This control is denoted by REF2 control hereinafter. REF1 control and REF2 control will be described hereinafter.

The video signal VS' output from the compression circuit 8 and the video signal VF' output from the compression/expansion circuit 9 are added by the adder 10 and then the sum signal is input to NTSC encoder 11 and encoded into an NTSC signal. The NTSC signal is converted into an analog video signal by digital/analog converter (D/A) 12 and output as final video signal.

Now, the operation of controlling the embodiment having the above configuration will be described below.

In this embodiment, it is so arranged that the control circuit 13 can change the synthetic reference levels REF1, REF2 in order to control the ratio to be used for synthetically combining the video signals VS' and VF' according to the brightness detection data input to it.

If the input video signal is determined to be a one with a small extent of exposure on the basis of the input data on the brightness, the brightness detection circuit 14 raised the reference levels REF1, REF2 so that the video signal produced from the adder 10 may contain the video signal VS' obtained by the low speed shutter at a high ratio. With this arrangement, it is possible to provide an optimal contrast for an image of a dark object showing a narrow dynamic range.

If, on the other hand, the input video signal is determined to be a one with a large extent of exposure on the basis of the input data on the brightness, the brightness detection circuit 14 lowers the reference levels REF1, REF2 so that the video signal produced from the adder 10 may contain the video signal VF' obtained by the high speed shutter at a high ratio. With this arrangement, it is possible to provide an optimal contrast for an image of a bright object showing a wide dynamic range.

Figure 3:
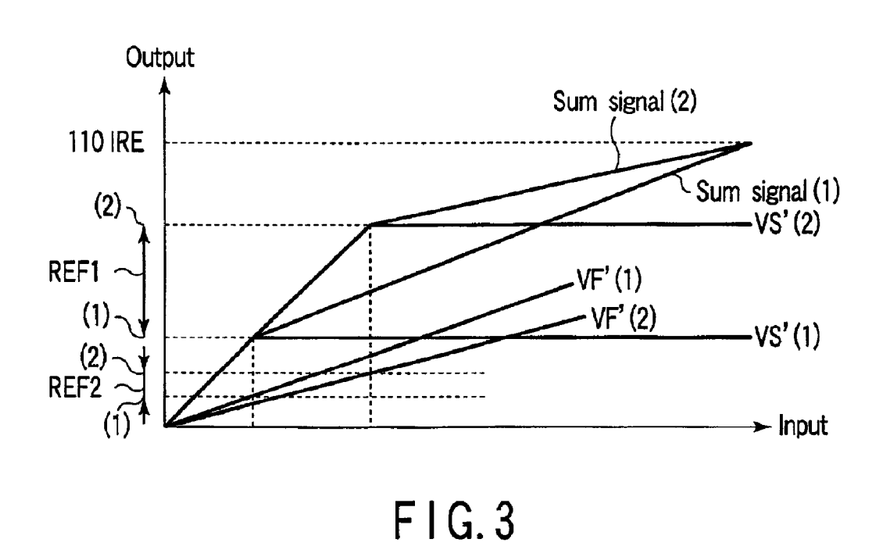
FIG. 3 is a schematic illustration of an addition signal to be used for broadening the dynamic range in the embodiment.

FIG. 3 is a schematic illustration of an addition signal that can be obtained by variably controlling the reference levels in the embodiment. Now, the control of the addition signal will be described below.

Firstly, the output level of the video signal VS obtained by operating the shutter at low speed and output from the switch 7 may rise according to the extent of exposure of the image pickup element 2 and eventually gets to a saturation level corresponding to the maximum output level of the image pickup element. So is the output level of the video signal VF obtained by operating the shutter at high speed.

As the video signal VS obtained by operating the shutter at low speed is input, the compression circuit 8 compares the level of the video signal VS with the reference level REF1 given from the control circuit 13 and it outputs the video signal VS without modifying it if the level of the video signal VS is lower than the reference level REF1, whereas it compresses the video signal VS to video signal VS' and outputs the latter signal if the level of the video signal VS is not lower than the reference level REF1. In FIG. 3, (1) indicates an instance where the reference level REF1 is lowered because of a large extent of exposure and (2) indicates an instance where the reference level REF1 is raised because of a small extent of exposure. Thus, video signal VS' (1) is output from the compression circuit 8 when the reference level REF1 is lowered, whereas video signal VS' (2) is output from the compression circuit 8 when the reference level REF1 is raised.

On the other hand, as the video signal VF obtained by operating the shutter at high speed is input, the compression/expansion circuit 9 compares the level of the video signal VF with the reference level REF2 given from the control circuit 13 and it cuts out the output if the level of the video signal VF is lower than the reference level REF2, whereas it reduces the level of the video signal VF to the level of REF2 to produce video signal VF' and outputs the latter signal. In FIG. 3, (1) indicates an instance where the reference level REF2 is lowered because of a large extent of exposure and (2) indicates an instance where the reference level REF2 is raised because of a small extent of exposure. Thus, video signal VF' (1) is output from the compression/expansion circuit 9 when the reference level REF2 is raised, whereas video signal VF' (2) is output from the compression/expansion circuit 9 when the reference level REF2 is lowered.

Thus, the sum signal output from the adder 10 is obtained by adding the video signal VS' output from the compression circuit 8 and the video signal VF' output from the compression/expansion circuit 9. The sum signal (1) will be VS' (1)+VF' (1) when the level of REF1 and that of REF2 are raised, whereas the sum signal (2) will be VS' (2)+VF' (2) when the level of REF1 and that of REF1 are lowered.

Preferably, the level of REF1 and that of REF2 are determined not independently but in an interlocked manner.

Now, the operation of automatically switching from the ordinary image pickup mode to the dynamic range broadening image pickup mode or vice versa depending on the difference between bright areas and dark areas of the object will be described below. It is assumed here that the image pickup element 2 is adapted to generate a video signal for 1 frame and 2 fields and either of the two different extents of exposure is selected on a field by field basis by the electronic shutter in order to make an existing image pickup element and an existing signal processing unit applicable to the embodiment.

Figure 4:
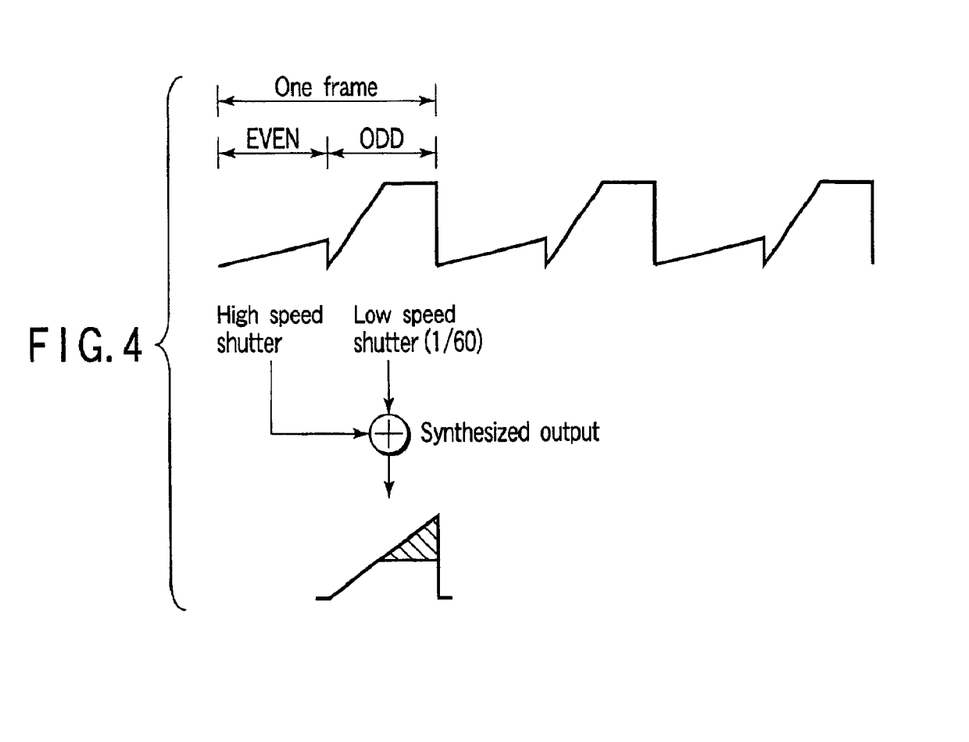
FIG. 4 is a timing chart illustrating the concept of synthetically combining field outputs in the embodiment.

Firstly, the low speed shutter fixed to 1/60 seconds is used for picking up an image with a large extent of exposure whereas a variable high speed shutter is used for picking up an image with a small extent of exposure. The two extents of exposure are switched from one to the other for every field. FIG. 4 schematically illustrates this operation. It is assumed here that the high speed shutter is used for EVEN fields and the low speed shutter is used for ODD fields. The obtained two images are then synthetically combined by referring to the above described synthetic reference levels (REF1, REF2).

Figure 5:
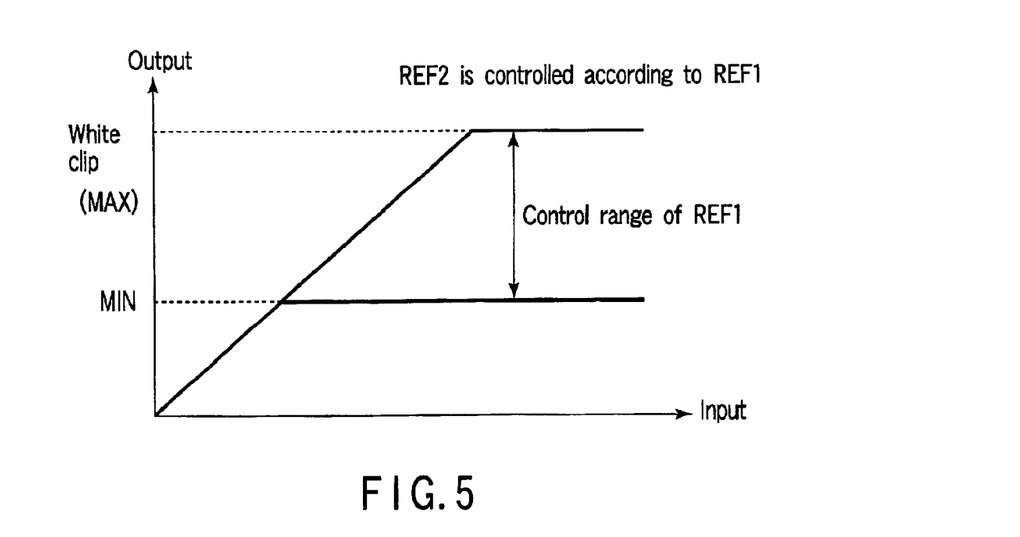
FIG. 5 is a schematic illustration of the operation of controlling the synthetic reference level of the embodiment.

In the EVEN field, the operation of the high speed shutter is automatically controlled according to the brightness of the video signal and optimal synthetic reference levels REF1, REF2 are determined as a function of the duration of open shutter. More specifically, if the duration of open shutter is further reduced for the high speed shutter (because the dynamic range of the bright object being shot is broadening), the synthetic reference levels REF1, REF2 will be lowered. If, to the contrary, the duration of open shutter is reduced for the high speed shutter (because the dynamic range of the dark object being shot is narrowing), the synthetic reference levels REF1, REF2 will be raised. When this control operation is conducted in a manner as shown in FIG. 5, the synthetic reference level REF1 is raised to the highest level for outputting a video signal (the white clip level) for a dark object requiring no dynamic range.

As a result of the above control operation, the ultimate output will be the video signal obtained by the low speed shutter. Since the adder 10 does not operates when a level higher than the white clip level is involved, the synthetic reference level REF1 that gets to the white clip level is detected and the operation is switched to the ordinary image pickup mode so that the switching operation is conducted without changing the brightness and the dynamic range and the obtained image will not be affected by the switch operation.

Figure 6:
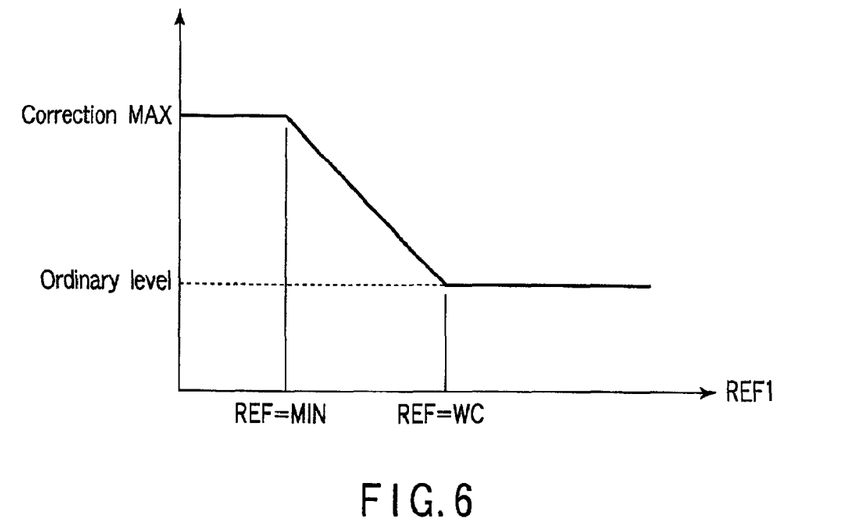
FIG. 6 is a schematic illustration of the correcting operation of the image quality control circuit of the embodiment.

Meanwhile, the video signal VS output from the terminal cl of the switch 7 is input to the image quality control circuit 15 to improve the quality of the synthesized image. For example, the image quality control circuit 15 may change the gamma curve to make dark areas of the image more visible and/or control so as to make details of the image clearly visible. At this time, the value used for the improvement is made to gradually converge to the corresponding value in the ordinary image pickup mode as shown in FIG. 6. As a result, the image quality will not show any noticeable change that may otherwise appear due to the change in the value used for the improvement at the time of switching over to the ordinary image pickup mode. In the instance of FIG. 6, the value to be used fro the improvement is controlled by means of the synthetic reference level REF1.

Now, the operation of controlling the single image memory 6 will be described.

As shown in FIG. 2, the single image memory 6 comprises first and second memory blocks A, B. The control circuit 13 changes the connections of the switches SW1, SW2 appropriately for the ordinary image pickup mode and the dynamic range broadening image pickup mode using two extents of exposure (to be referred to as WDR image pickup mode hereinafter) to selectively use the inputs and the outputs of the memory blocks A, B and, at the same time, controls the read and write operations of the memory blocks A, B.

Figure 7A:
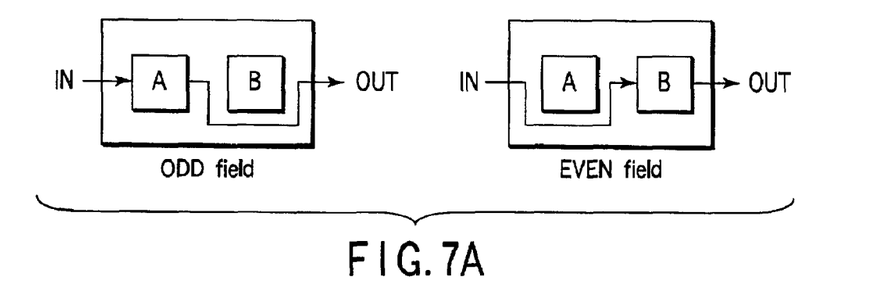
FIGS. 7A and 7B are schematic block diagrams of memory control in the ordinary image pickup mode and also in the dynamic range broadening image pickup mode of the embodiment.

In the ordinary image pickup mode, the data already written in the first memory block A is read out while the input data is being written into it as shown in FIG. 7A. The read out data is not the data being written but the data that was written in the last write session. In other words, the read out data is that of the immediately preceding field. In the next field, the data of the immediately preceding field is read out from the second memory block B while the input data is being written into it. In this way, the memory blocks A, B are accessed alternately on a field by field basis.

Figure 7B:
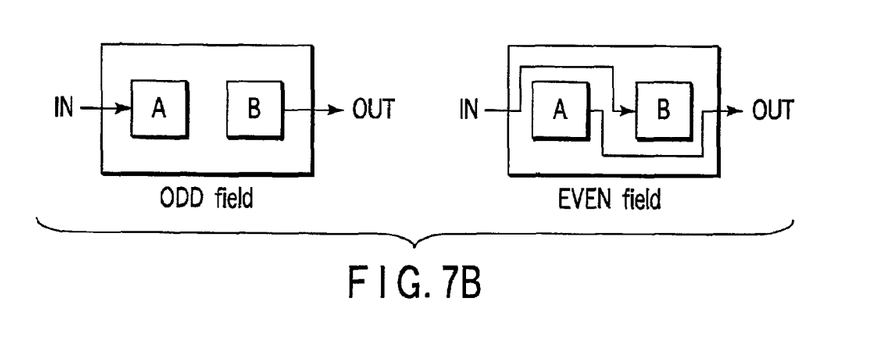

On the other hand, in the WDR image pickup mode, an operation as illustrated in FIG. 7B takes place for synthetically combining the image of the immediately preceding field (taken by using the high speed shutter) and the image of the current field (taken by using the low speed shutter).

More specifically, while a data is being written in the first memory block A, the data of the immediately preceding field stored in the second memory block B is read out. Thus, the synthesized image is obtained by combining the data being written in the first memory block A and the data stored in the second memory block B for the immediately preceding field. Similarly, while a data is being written in the second memory block B, the data of the immediately preceding field stored in the first memory block A is read out. Thus, the synthesized image is obtained by combining the data being written in the second memory block B and the data stored in the first memory block A for the immediately preceding field.

Figure 8:
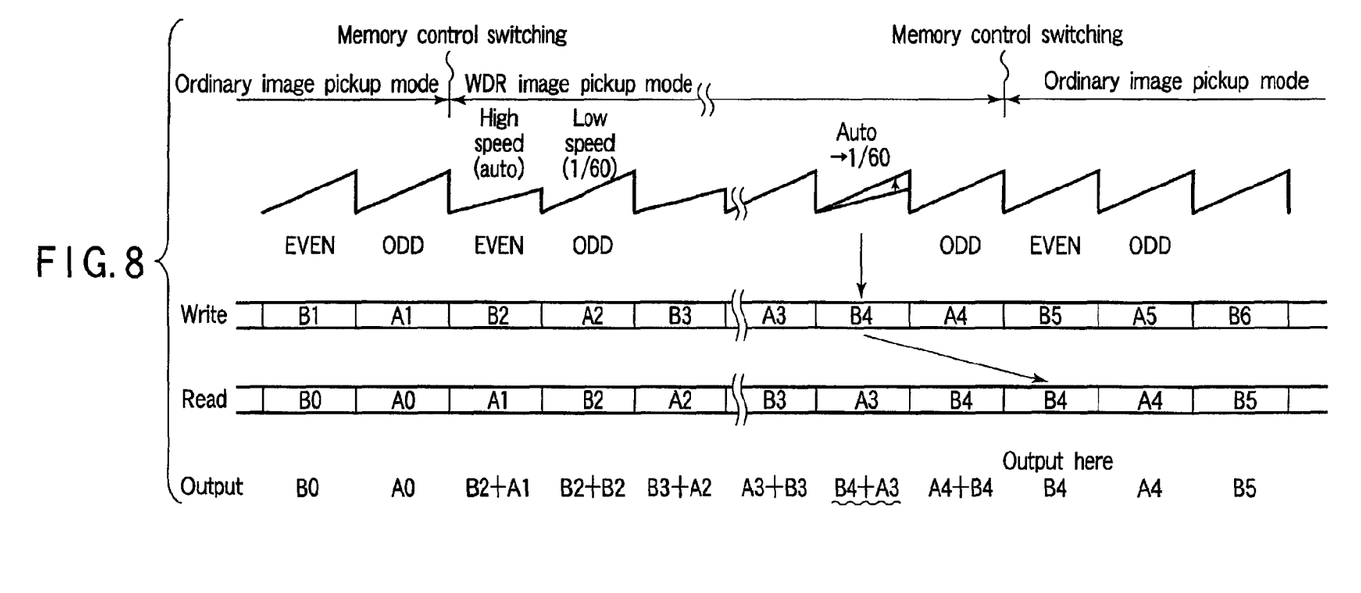
FIG. 8 is a timing chart illustrating the memory access control for a mode switching operation of the embodiment.

FIG. 8 is a timing chart illustrating the memory access control for a mode switching operation of the embodiment. In FIG. 8, A* and B** indicate time advancement. The memory comprises a first memory block A and a second memory block B. Referring to FIG. 8, at the time when the mode is switched from the WDR image pickup mode to the ordinary image pickup mode, the field of B4 is output in the ordinary image pickup mode and hence the low speed shutter needs to be selected in order to avoid any abrupt change in the image brightness. More specifically, since the synthetic reference level REF1 is actually held to the white clip level, the output of B4+A3 is in fact equal to A3 and hence no problem arises if the shutter is switched. Then, as B4 is output immediately after the switch to the ordinary image pickup mode, the brightness is made to match the low speed shutter.

With the above described control operation, the mode can be switched from the WDR image pickup mode to the ordinary image pickup mode or vice versa quite smoothly without any abrupt change in the image brightness.

Figure 9:
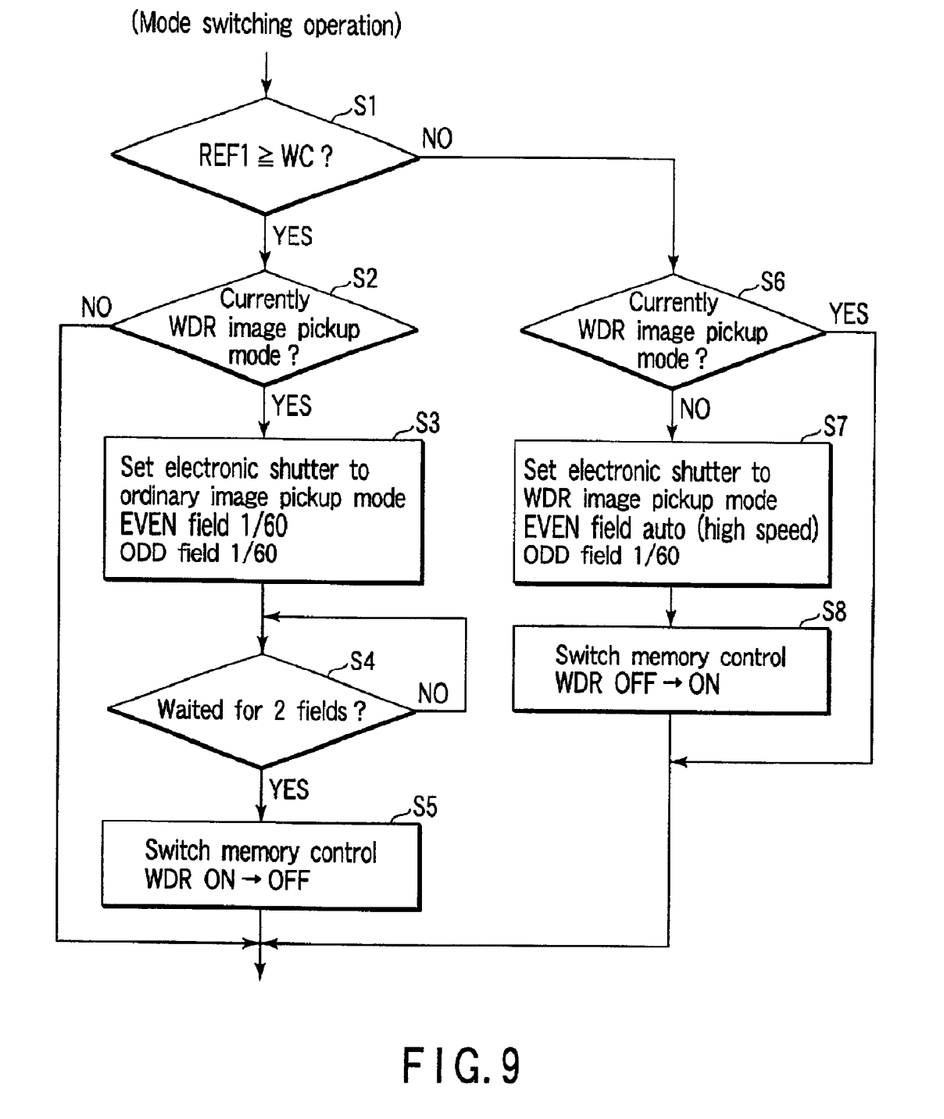
FIG. 9 is a schematic flow chart of a mode switching operation of the embodiment.

FIG. 9 is a schematic flow chart of a mode switching operation of the embodiment. On the way, the operation is held to a status of waiting for two fields so that B4 may be selected reliably. While the flow chart does not show any sequence of fields for the timing of mode switching, the mode switching control operation is made to start from an EVEN field.

Referring to FIG. 9, firstly, the synthetic reference level REF1 is compared with the while clip level WC (S1) and, if REF1≧WC (Y), the current mode is determined to be the WDR image pickup mode (S2). If the current mode is determined to be not the WDR image pickup mode (N), the processing operation of the ordinary image pickup mode continues.

If, on the other hand, the current mode is determined to be the WDR image pickup mode (Y) in Step S2, the duration of exposure of the electronic shutter is made equal to that of the ordinary image pickup mode (EVEN field: 1/60 seconds, ODD field: 1/60 seconds) (S3) and the status of waiting for two fields is confirmed (S4). Subsequently, the memory control is switched (and hence WDR is switched from ON to OFF) (S5) to proceed with the processing operation of the ordinary image pickup mode thereafter.

If it is determined in Step S1 that REF1≧WC does not hold true (N), then it is determined if the current mode is the WDR image pickup mode or not (S6). If it is determined that the current mode is the WDR image pickup mode (Y), the processing operation of the WDR image pickup mode is continued.

If it is determined in Step S6 that the current mode is not the WDR image pickup mode (N), the duration of exposure of the electronic shutter is made equal to that of the WDR image pickup mode (EVEN field: automatic (high speed), ODD field: 1/60 seconds (low speed)) (S7) and the memory control is switched (and hence WDR is switched from OFF to ON) to proceed with the processing operation of the WDR image pickup mode thereafter.

With the above described video signal processing method, an image with a broadened dynamic range is output for an object that requires a dynamic range by synthetically combining images obtained with two different extents of exposure, whereas an image obtained for each field with an ordinary extent of exposure is output without any change in the brightness for an object not requiring any dynamic range.

Thus, with the system of using two different extents of exposure for each field, while the synthesized image obtained immediately after an expansion of the dynamic range shows a degraded vertical resolution and a reduced number of frames, the degradation of vertical resolution and a reduced number of frames can be avoided for the image picked up for an object that does not require any dynamic range because the mode of operation is automatically switched to the ordinary image pickup mode.

In the above described embodiment, not only the duration of exposure but also the opening of the lens diaphragm 1 can be used to regulate the extent of exposure.

As may be clearly understood from the above description of a preferred embodiment of image pickup device according to the invention using a signal processing method also according to the invention, an ordinary image pickup mode is automatically switched to a dynamic range broadening image pickup mode or vice versa in the embodiment depending on the difference between bright areas and dark areas of the object being shot. Then, in the wide dynamic range image pickup mode, the obtained image of the object shows a sufficient degree of contract between dark areas and bright areas of the object. Additionally, any abrupt changes in the image can be avoided at the time of switching from an ordinary image pickup mode to a dynamic range broadening image pickup mode or vice versa.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup device comprising:
   an image pickup element for picking up an image of an object and generating a video signal of a frame and two fields out of the image;
   an exposure control processor for providing two extents of exposure per field for said image pickup element;
   a signal compression processor for compressing the first video signal output from said image pickup element for the larger extent of exposure as provided by said exposure control processor and exceeding a first reference value;
   a signal compression/expansion processor for compressing or expanding the second video signal output from said image pickup element for the smaller extent of exposure as provided by said exposure control processor and exceeding a second reference value;
   an addition processor for adding the signal from said compression processor and the signal from said compression/expansion processor and generating an output video signal having a dynamic range broader than the dynamic range of said image pickup element;

a detection processor for detecting the second video signal and discriminating one obtained for the smaller extent of exposure and one obtained for the larger extent of exposure by referring to the brightness of said second video signal;

a reference value control processor for decreasing said first reference value and said second reference value in response to detection of a video signal by said detection processor for the larger extent of exposure and increasing said first reference value and said second reference value in response to detection of a video signal by said detection processor for the smaller extent of exposure; and a mode switching processor for canceling the two extents of exposure and selecting an ordinary image pickup mode for the first reference value exceeding a predetermined value or selecting a dynamic range broadening image pickup mode for the first reference value underlying said predetermined value without canceling the two extents of exposure.

2. The image pickup device according to claim 1, wherein said predetermined value corresponds to the white clip level of said image pickup element.

3. The image pickup device according to claim 1, wherein said exposure control processor controls the exposure by switching the duration of exposure of the electronic shutter of said image pickup element.

4. The image pickup device according to claim 1, further comprising:

an image quality control processor for correcting the image quality of said first video signal in order to improve the appearance of the synthesized image; and an image quality correction control processor for controlling the correction by the image quality control processor along with said first reference value.

5. The image pickup device according to claim 4, wherein said image quality correction control processor is adapted to selecting the ordinary image pickup mode when said first reference value exceeds said predetermined value and operating to maximize the correction when said reference value does not exceed said predetermined value.

6. An image pickup device comprising:

an image pickup element for picking up an image of an object and generating a video signal of a frame and two fields out of the image;

an exposure control means for providing two extents of exposure per field for said image pickup element;

a signal compression means for compressing the first video signal output from said image pickup element for the larger extent of exposure as provided by said exposure control means and exceeding a first reference value;

a signal compression/expansion means for compressing or expanding the second video signal output from said image pickup element for the smaller extent of exposure as provided by said exposure control means and exceeding a second reference value;

an addition means for adding the signal from said compression means and the signal from said compression/expansion means and generating an output video signal having a dynamic range broader than the dynamic range of said image pickup element;

a detection means for detecting the second video signal and discriminating one obtained for the smaller extent of exposure and one obtained for the larger extent of exposure by referring to the brightness of said second video signal;

a reference value control means for decreasing said first reference value and said second reference value in response to detection of a video signal by said detection means for the larger extent of exposure and increasing said first reference value and said second reference value in response to detection of a video signal by said detection means for the smaller extent of exposure; and a mode switching means for canceling the two extents of exposure and selecting an ordinary image pickup mode for the first reference value exceeding a predetermined value or selecting a dynamic range broadening image pickup mode for the first reference value underlying said predetermined value without canceling the two extents of exposure.

7. The image pickup device according to claim 6, wherein said predetermined value corresponds to the white clip level of said image pickup element.

8. The image pickup device according to claim 6, wherein said exposure control means controls the exposure by switching the duration of exposure of the electronic shutter of said image pickup element.

9. The image pickup device according to claim 6, further comprising:

an image quality control means for correcting the image quality of said first video signal in order to improve the appearance of the synthesized image; and an image quality correction control means for controlling the correction by the image quality control means along with said first reference value.

10. The image pickup device according to claim 9, wherein said image quality correction control means is adapted to selecting the ordinary image pickup mode when said first reference value exceeds said predetermined value and operating to maximize the correction when said reference value does not exceed said predetermined value.

11. A video signal processing method comprising:

an exposure control step of providing two extents of exposure per field for an image pickup element adapted to pick up an image of an object and generating a video signal of a frame and two fields out of the image;

a signal compression step of compressing the first video signal output from said image pickup element for the larger extent of exposure as provided by said exposure control step and exceeding a first reference value;

a signal compression/expansion step for compressing or expanding the second video signal output from said image pickup element for the smaller extent of exposure as provided by said exposure control step and exceeding a second reference value;

an addition step of adding the signal from said compression step and the signal from said compression/expansion step and generating an output video signal having a dynamic range broader than the dynamic range of said image pickup element;

a detection step for detecting the second video signal and discriminating one obtained for the smaller extent of exposure and one obtained for the larger extent of exposure by referring to the brightness of said second video signal;

a reference value control step for decreasing said first reference value and said second reference value in response to detection of a video signal by said detection step for the larger extent of exposure and increasing said first reference value and said second reference value in response to detection of a video signal by said detection step for the smaller extent of exposure; and a mode switching step for canceling the two extents of exposure and selecting an ordinary image pickup mode for the first reference value exceeding a predetermined value or selecting a dynamic range broadening image pickup mode for the first reference value underlying said predetermined value without canceling the two extents of exposure.

12. The video signal processing method according to claim 11, wherein said mode switching step is adapted to select a value corresponding to the white clip level of said image pickup element for said predetermined value.

13. The video signal processing method according to claim 11, wherein said exposure control step is adapted to control the exposure by switching the duration of exposure of the electronic shutter of said image pickup element.

14. The video signal processing method according to claim 11, further comprising:

an image quality control step for correcting the image quality of said first video signal in order to improve the appearance of the synthesized image; and an image quality correction control step for controlling the correction by the image quality control means along with said first reference value.

15. The video signal processing method according to claim 14, wherein said image quality correction control step is adapted to selecting the ordinary image pickup mode when said first reference value exceeds said predetermined value and operating to maximize the correction when said reference value does not exceed said predetermined value.

* * * * *